United States Patent
Karve et al.

(10) Patent No.: US 9,298,413 B1
(45) Date of Patent: Mar. 29, 2016

(54) SYSTEM, METHOD, AND COMPUTER PROGRAM PRODUCT FOR CHANGING A STATE OF OPERATION OF A DISPLAY SYSTEM WITH RESPECT TO AT LEAST A PORTION OF AN IMAGE OCCLUDED BY A NON-DISPLAY SURFACE

(75) Inventors: Aneesh Padmakar Karve, Mountain View, CA (US); Rishi Nair, Issaquah, WA (US); Robert Alan Tray, Fort Collins, CO (US); David Lee Eng, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 643 days.

(21) Appl. No.: 13/189,421

(22) Filed: Jul. 22, 2011

(51) Int. Cl.
*G06F 3/048* (2013.01)
*G06F 3/14* (2006.01)

(52) U.S. Cl.
CPC ........ *G06F 3/1446* (2013.01); *G09G 2300/026* (2013.01)

(58) Field of Classification Search
CPC .................. G09G 2300/026; G06F 3/1446
USPC ..................... 715/761, 771; 345/1.3
See application file for complete search history.

(56) References Cited

U.S. PATENT DOCUMENTS

| | | | | |
|---|---|---|---|---|
| 7,864,203 B1* | 1/2011 | Fear et al. | ...... | 345/698 |
| 8,400,370 B2* | 3/2013 | Yoshida et al. | ...... | 345/1.3 |
| 2004/0027392 A1* | 2/2004 | Dunn et al. | ...... | 345/810 |
| 2006/0012616 A1* | 1/2006 | Paek | ...... | 345/698 |
| 2006/0033712 A1* | 2/2006 | Baudisch et al. | ...... | 345/157 |
| 2007/0120763 A1* | 5/2007 | De Paepe et al. | ...... | 345/1.3 |
| 2009/0109125 A1* | 4/2009 | Young et al. | ...... | 345/1.3 |
| 2009/0309808 A1* | 12/2009 | Swingler | ...... | 345/1.3 |
| 2010/0033402 A1* | 2/2010 | Yoshida et al. | ...... | 345/1.3 |
| 2010/0238090 A1* | 9/2010 | Pomerantz et al. | ...... | 345/1.3 |
| 2011/0164065 A1* | 7/2011 | Mate et al. | ...... | 345/676 |
| 2011/0164075 A1* | 7/2011 | Suzuki et al. | ...... | 345/691 |
| 2012/0084673 A1* | 4/2012 | Sirpal et al. | ...... | 715/761 |

* cited by examiner

*Primary Examiner* — Anil Bhargava
(74) *Attorney, Agent, or Firm* — Zilka-Kotab, PC (57) ABSTRACT

A system, method, and computer program product are provided for changing a state of operation of a display system with respect to at least a portion of an image occluded by a non-display surface. In use, a display system is operated in a first state associated with an occlusion of at least a portion of an image resulting from a non-display surface associated with the display system. Additionally, independent of a control panel user interface, a command is received to operate the display system in a second state associated with the occlusion of the at least a portion of the image resulting from the non-display surface associated with the display system. Furthermore, in response to the command, the display system is operated in the second state associated with the occlusion of the at least a portion of the image resulting from the non-display surface associated with the display system.

20 Claims, 6 Drawing Sheets

SYSTEM, METHOD, AND COMPUTER PROGRAM PRODUCT FOR CHANGING A STATE OF OPERATION OF A DISPLAY SYSTEM WITH RESPECT TO AT LEAST A PORTION OF AN IMAGE OCCLUDED BY A NON-DISPLAY SURFACE

FIELD OF THE INVENTION

The present invention relates to display systems, and more particularly to operational states of display systems.

BACKGROUND

Traditionally, display systems are capable of operating between two states with respect to images or portions thereof occluded (i.e. hidden) by a non-display surface (e.g. bezel) of the display system. The first state involves the image portion being displayed (e.g. behind the bezel) such that the image portion is occluded by the non-display surface. The second state involves adjusting the image displayed by the display system such that the image portion otherwise occluded by the non-display surface is displayed within an area surrounded by the non-display surface (and thus not occluded by the non-display surface such that it is viewable by a user). Unfortunately, techniques for switching between the two states have typically been limited.

For example, switching from one of the display states to the other one of the display states has conventionally required a user to open a control panel user interface, select an option to change the display state, and then save the selected option. In situations where the user is using the display system to view, interact with, etc. an application (e.g. a game, video, etc.), the user's involvement with the application is required to be interrupted for an extended period of time in order to switch the display states as described above. This interruption is oftentimes unwanted, particularly where the display state is desired to be changed without interruption to a game, video, or other real-time based application.

There is thus a need for addressing these and/or other issues associated with the prior art.

SUMMARY

A system, method, and computer program product are provided for changing a state of operation of a display system with respect to at least a portion of an image occluded by a non-display surface. In use, a display system is operated in a first state associated with an occlusion of at least a portion of an image resulting from a non-display surface associated with the display system. Additionally, independent of a control panel user interface, a command is received to operate the display system in a second state associated with the occlusion of the at least a portion of the image resulting from the non-display surface associated with the display system. Furthermore, in response to the command, the display system is operated in the second state associated with the occlusion of the at least a portion of the image resulting from the non-display surface associated with the display system.

DETAILED DESCRIPTION

Figure 1:
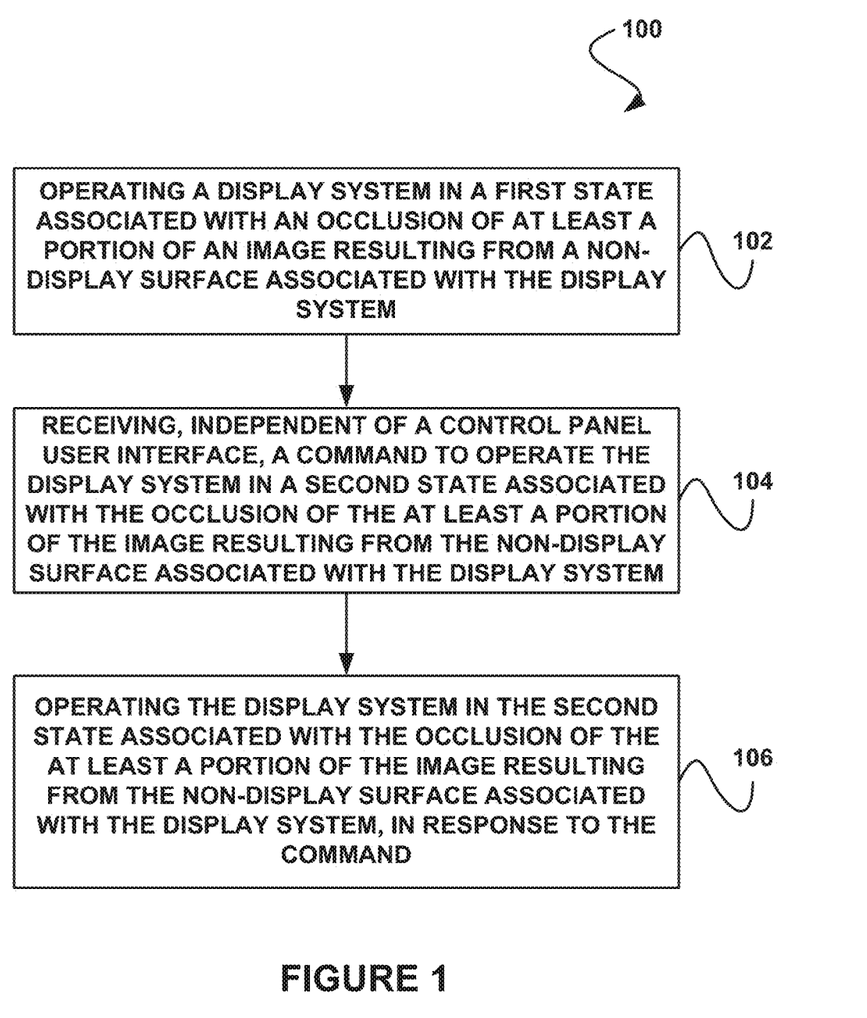
FIG. 1 shows a method for changing a state of operation of a display system with respect to at least a portion of an image occluded by a non-display surface, in accordance with one embodiment.

FIG. 1 shows a method for changing a state of operation of a display system with respect to at least a portion of an image occluded by a non-display surface, in accordance with one embodiment. As shown in operation 102, a display system is operated in a first state associated with an occlusion of at least a portion of an image by a non-display surface. In the context of the present description, the display system may include any system having at least one display device utilized for displaying display content.

For example, the one or more display devices of the display system may include a computer monitor, a liquid crystal display (LCD), a projector, or any other device capable of displaying display content. Of course, it should be noted that the display content may include any image, video, etc. capable of being provided to the display device for display thereof. In this way, the display system may include or otherwise be connected to a computer or other processing system providing the display content to the one or more display devices for display purposes.

As noted above, the display system may include at least one display device displaying display content. Thus, the display system may include a single display device, as an option. As another option, the display system may include a plurality of display devices across which the display content is spanned.

As also noted above, the display system operates in a first state associated with the occlusion of at least a portion of an image by a non-display surface. In one embodiment, the portion of the image may be pixels located in an area of the non-display surface (i.e. such that they are not viewable by a user viewing the display system). For example, the non-display surface may include a bezel of a display device of the display system, such that the pixels may be occluded as result of the pixels being located behind at least one bezel of the display system.

The bezel may be any frame or other component of a display device of the display system which covers or otherwise prevents visibility (e.g. by a user) of a portion a display panel of the display device, such that any pixels displayed on such portion of the display panel are occluded. To this end, each display device of the display system may have a separate bezel capable of occluding pixels displayed by a display panel of the display device. Of course, as another example, the non-display surface may include a space between projections, such that a portion of the image may be occluded as a result of the portion of the image being located in an area of the space between the projections.

In one embodiment, the first state in which the display system is operating may include displaying the portion of the image such that the portion of the image is occluded by the non-display surface. With respect to such embodiment, display content provided to the display device(s) for display thereof may not necessarily be adjusted to compensate for the non-display surface, including the non-visible portion of the display system (e.g. the non-visible display panel of the display device resulting from the bezel of such display device).

In another embodiment, the first state in which the display system is operating may include adjusting the display content including the portion of the image such that the portion of the image is displayed within an area surrounded by the non-display surface. The adjustment may alter a size of the display content, for example, to allow the display content to be fully displayed by the display surface (e.g. within the area surrounded by the non-display surface). It should be noted that such alteration may stretch or otherwise distort the content. With respect to this embodiment, the occlusion of the portion of the image by the non-display surface may be prevented.

As an option, the first state may be a default state of the display system. For example, the display system may operate in the first state (e.g. upon start-up, etc.) based on a default configuration. Such default configuration may be customized by a user, as an option (e.g. via the control panel user interface).

As another option, the first state may be a user-configured state of the display system. Just by way of example, the display system may start-up in a different default state, and a user may command the display system to change operation from the different default state of operation to the first state of operation. Of course, however, the first state of operation of the display device may be entered into in any desired manner.

Additionally, independent of a control panel user interface, a command is received to operate the display system in a second state associated with the occlusion of the at least a portion of the image resulting from the non-display surface associated with the display system. Note operation 104. To this end, the command may include any instruction to operate the display system in the second state associated with the occlusion of the portion of the image resulting from the non-display surface associated with the display system.

With respect to the present description, receiving the command independently of the control panel user interface may include receiving the command without any interaction (e.g. user interaction) with the control panel user interface. Such control panel user interface may include any graphical user interface (GUI) of a control panel associated with the display system.

In one embodiment, the command may be received utilizing a shortcut key. The shortcut key may include any predetermined combination of keys or other input. Optionally, the shortcut key may be a default shortcut key, a shortcut key pre-configured by a user utilizing the control panel user interface, etc.

In another embodiment, the command may be received utilizing a button on a taskbar displayed by the display system. For example, a single selection of the button may result in receipt of the command. In yet another embodiment, the command may be received utilizing a physical sensor of the display system (e.g. by the sensor sensing a predetermined physical gesture of a user).

As an option, the command may be received during execution of an application (e.g. game, video, etc.) having content displayed by the display system. Such command may be received without displaying a user interface over the application. For example, by using the shortcut key, taskbar button, physical gesture, etc., the display system may be commanded to change its state of operation with respect to the occlusion of the pixels located behind the at least one bezel of the display system, without necessarily interrupting, blocking display resulting from, etc. the execution of the application.

Moreover, the second state in which the display system is commanded to operate may include any state of the display system which is associated with the occlusion of the portion of the image resulting from the non-display surface associated with the display system (e.g. pixels located behind the at least one bezel of the display system) and which is different from the first state in which the display system is operating. Thus, the command may function to change a state of operation of the display system from the first state to the second state.

Just by way of example, in the embodiment where the first state in which the display system is operating includes displaying the portion of the image in the non-display surface associated with the display system such that the portion of the image is occluded by the non-display surface, then the second state in which the display system is commanded to operate may include adjusting (e.g. via output scaling) the display content including the portion of the image such that the portion of the image is displayed within an area surrounded by the non-display surface to prevent occlusion of the portion of the image by the non-display surface. As another example, in the embodiment, where the first state in which the display system is operating includes adjusting the display content including the portion of the image such that the portion of the image is displayed within an area surrounded by the non-display surface, then the second state in which the display system is command to operate may include displaying the portion of the image such that the portion of the image is occluded by the non-display surface.

Furthermore, as shown in operation 106, the display system is operated in the second state associated with the occlusion of the at least a portion of the image resulting from the non-display surface associated with the display system, in response to the command. Thus, the display system may change from operating in the first state to operating in the second state, in response to the receipt of the command. Such change may include retrieving a current state of the operation of the display system (i.e. the first state) and setting the current state of the operation of the display system to be the opposite state (i.e. second state).

By allowing such change to occur independently of the control panel user interface, the change may be initiated more quickly via the command (than otherwise would be allowed via use of the control panel user interface to change the state of the display system). Moreover, user viewing of display content via the display system may not necessarily be required to be interrupted for submitting the command. Just by way of example, a user playing a game via the display system, where the display system is operating the first state, may adjust the display system to operate in the second state via the command (e.g. without interruption to the game).

This may allow a user to view portions of the game where an image portion is occluded (e.g. to view the content without distortion, but with the expense of non-viewable pixels), and to quickly switch other portions of the game to be viewed where the image portion is not occluded (e.g. but where the content being displayed is possibly distorted, stretched, etc.). Accordingly, the user may switch the operational states of the display system based on the desires of the user at any particular point in time (e.g. desiring image portion occlusion when the hidden portions may not necessarily negatively impact the user's interaction with the game, desiring no image portion occlusion when the hidden portions are more likely to negatively impact the user's interaction with the game, such as when viewing an in-game menu, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
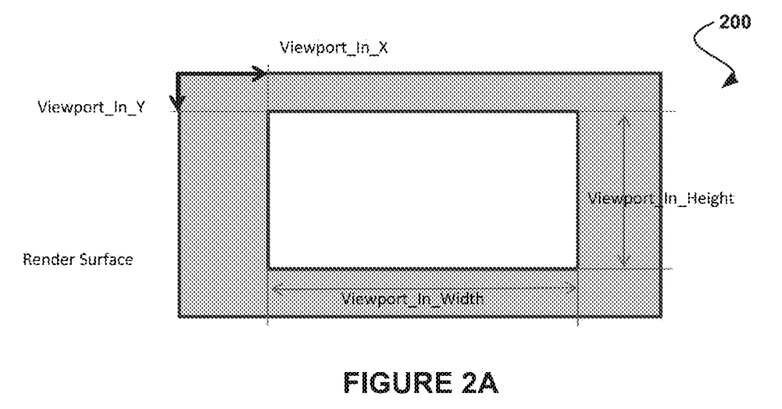
FIGS. 2A-B show a system for changing a state of operation of a display system within respect to pixels occluded by a display bezel, in accordance with another embodiment.
Figure 2B:
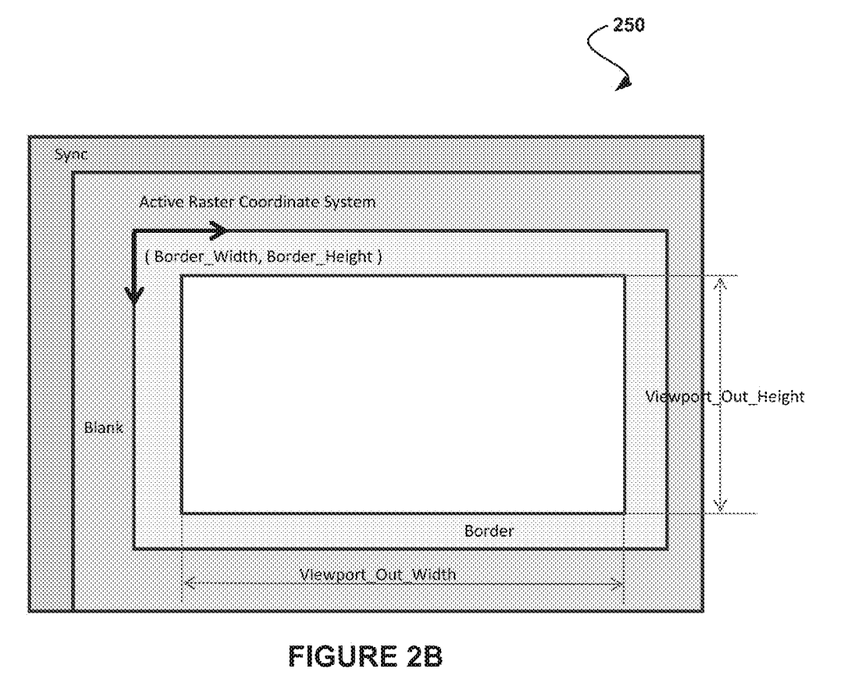

FIGS. 2A-B show a system 200-250 for changing a state of operation of a display system within respect to pixels occluded by a display bezel, in accordance with another embodiment. As an option, the system 200-250 may be implemented to carry out the method 100 of FIG. 1. Of course, however, the system 200-250 may be implemented in any desired environment. Again, it should be noted that the aforementioned definitions may apply during the present description.

FIG. 2A shows a viewport coordinate system of a display panel in memory (i.e. a coordinate system of the display panel having occlusion from a bezel). FIG. 2B shows a raster coordinate system of a scanout to the display panel. The raster coordinate system may be different than the viewport coordinate system, for example, where the raster coordinate system has been adjusted to prevent the occlusion of pixels.

After the pixels of display content are rendered in memory, the input viewport is cut out of the render surface (as shown in FIG. 2A). The output viewport is sized and positioned in the active (non-occluded) part of the raster surface (as shown in FIG. 2B). The size and the shape of the input viewport may not necessarily be the same as the output viewport. By making them different, output scaling provided.

Figure 3:
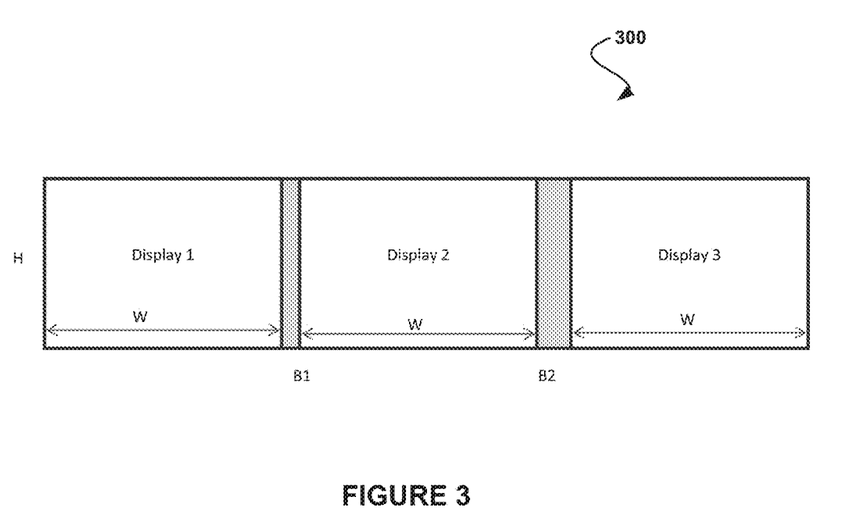
FIG. 3 shows a display system, in accordance with yet another embodiment.

FIG. 3 shows a display system 300, in accordance with yet another embodiment. As an option, the display system 300 may be implemented in the context of the functionality and architecture of FIGS. 1-2. Of course, however, the display system 300 may be implemented in any desired environment. Again, it should be noted that the aforementioned definitions may apply during the present description.

Changing the operational state of a display system from having occluded pixels to preventing occluded pixels utilizes height/width (hw) scaling. The scaling may be provided in real-time, without the need for a modeset, by manipulating the viewport_in values. For example, N pixels may be occluded by the bezels between two displays, and both displays may be at a resolution of W×H. The operational state in which the bezel-based occlusion of pixels is prevented, the un-occluded per-display images of size (W+N/2)×H may be scaled down to size (using hw scaling described above) W×H and shown on both displays. Table 1 illustrates exemplary viewport_in values for each of three displays of a display system when the display system is in an operational state in which pixels are occluded by the bezel.

TABLE 1

Display_1 (0, 0, W, H), Display_2 (W+B1, 0, W, H), Display_3(2W+B1+B2, 0, W, H

The operational state in which there exists the bezel-based occlusion of pixels, the image may include the original provided by the computing system. Table 2 illustrates exemplary viewport_in values for each of three displays of a display system when the display system is in an operational state in which pixels are prevented from being occluded by the bezel.

TABLE 2

Figure 4A:
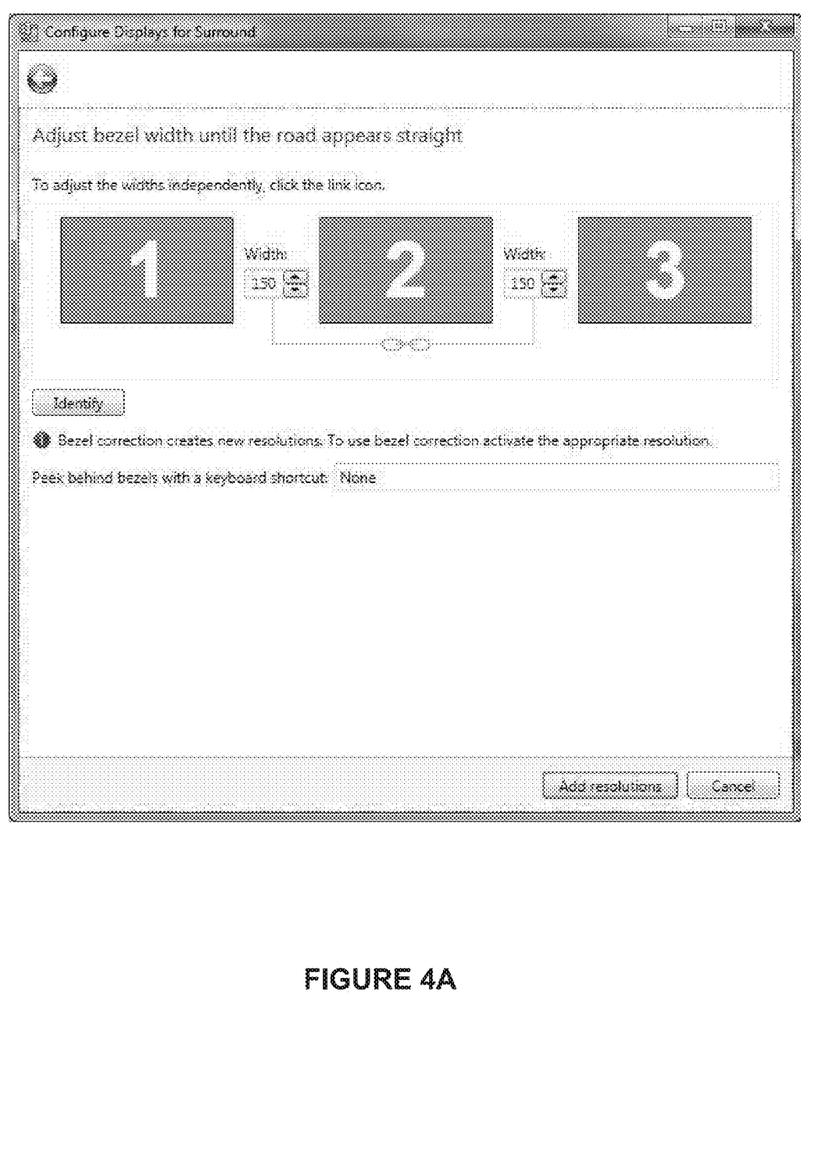
FIGS. 4A-C show user interfaces for configuring a command to be utilized for changing a state of operation of a display system within respect to pixels occluded by a display bezel, in accordance with still yet another embodiment.
Figure 4B:
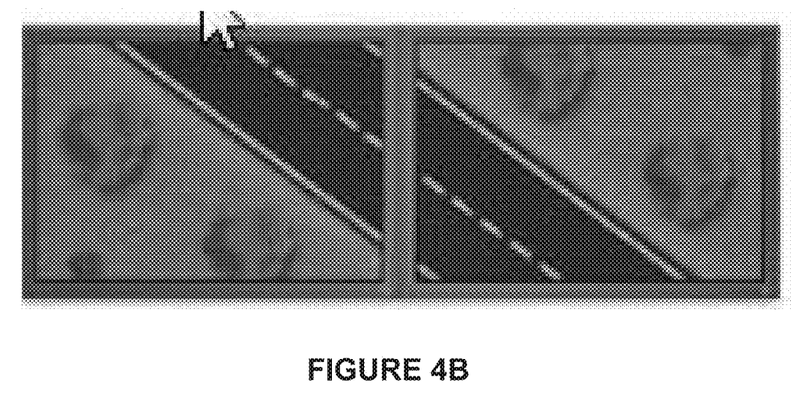
Figure 4C:
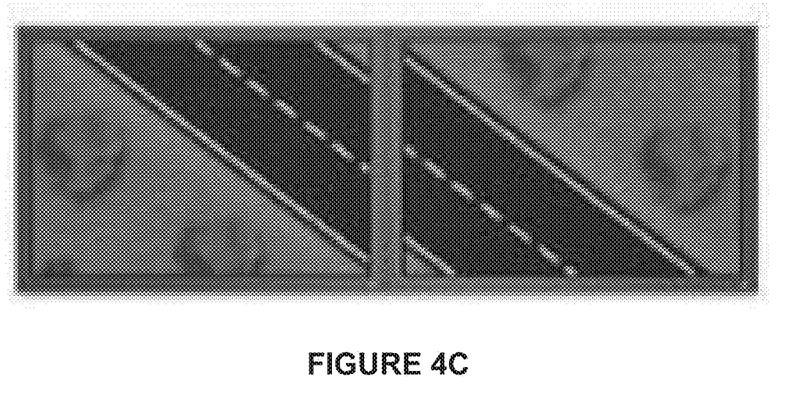

Display_1 (0, 0, W1, H), Display_2 (W1, 0, W1, H), Display_3(2W1, 0, W1, H)
Where W1 = (3W+B1+B2)/3, and
Where the viewport_out values are left unmodified FIGS. 4A-C show user interfaces for configuring a command to be utilized for changing a state of operation of a display system within respect to pixels occluded by a display bezel, in accordance with still yet another embodiment. As an option, the user interfaces may be implemented in the context of the functionality and architecture of FIGS. 1-3. Of course, however, the user interfaces may be implemented in any desired environment. Again, it should be noted that the aforementioned definitions may apply during the present description.

As shown in FIG. 4A, a GUI is provided for allowing a user to pre-configure an operational state of a display system in which pixels are occluded by a bezel of display devices of the display system. The GUI provides visual indicators to adjust the width of content displayed by each display device. By modifying the numerical values (shown set at "150"), a test image (shown in FIGS. 4B-C) displayed across multiple display devices of the display system (and optionally at least in part behind the GUI) is modified. The numerical values may be modified to allow the user to indicate when the test image spans the display devices in a manner desired by the user (e.g. in a streamlined manner shown in FIG. 4B without the distortion shown in FIG. 4C). The GUI may also be used by the user to configure the shortcut key to be utilized for changing the operational states of the display system.

Figure 5:
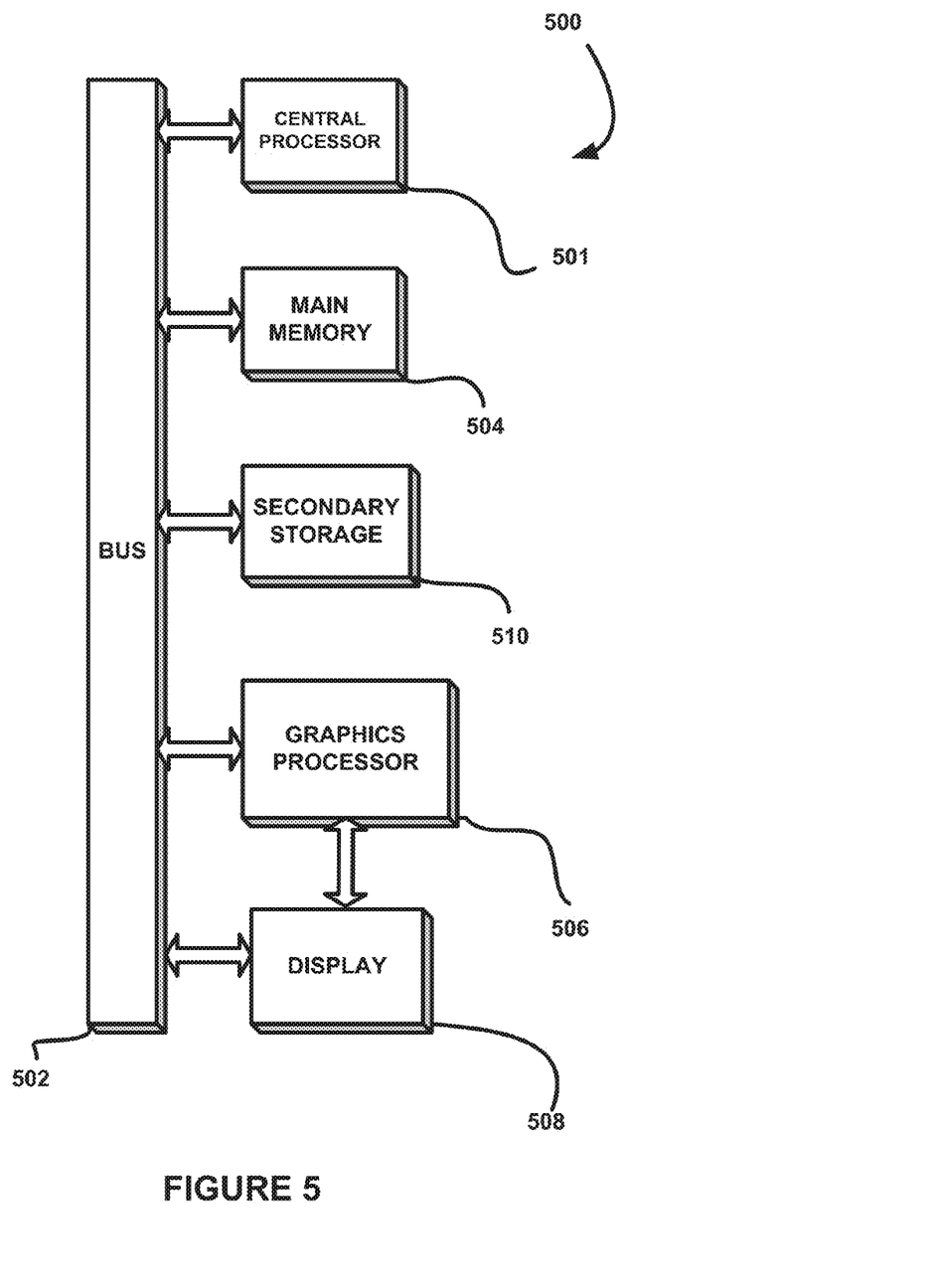
FIG. 5 shows an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices m including, but not limited to a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for operating a display system in a first state associated with an occlusion of at least a portion of an image resulting from a non-display surface associated with the display system during execution of an application, wherein a width of the non-display surface is specified by a numerical value that is modified by a user;
   computer code for receiving a command to operate the display system in a second state associated with the occlusion of the at least a portion of the image resulting from the non-display surface associated with the display system, wherein the command is received without displaying a user interface over the application;
   computer code for adjusting display content including the at least a portion of the image such that the at least a portion of the image is displayed within an area of a display surface that is not occluded by the non-display surface in response to the command, wherein the adjusting comprises modifying a value associated with an input viewport that is used to cut the display content out of a render surface stored in memory, and the adjusting is performed without displaying a user interface over the application; and
   computer code for operating the display system in the second state during execution of the application, in response to the command.

2. The computer program product of claim 1, wherein the display system includes a single display device displaying the display content.

3. The computer program product of claim 1, wherein the display system includes a plurality of display devices across which the display content is spanned.

4. The computer program product of claim 1, wherein the first state includes displaying the at least a portion of the image such that the pixels are occluded by the non-display surface.

5. The computer program product of claim 1, wherein the first state is a default state of the display system.

6. The computer program product of claim 1, wherein the first state is a user-configured state of the display system.

7. The computer program product of claim 1, wherein the computer program product is operable such that the command is received without user interaction with a control panel user interface.

8. The computer program product of claim 1, wherein the computer program product is operable such that the command is received utilizing a shortcut key.

9. The computer program product of claim 1, wherein the computer program product is operable such that the command is received utilizing a physical sensor of the display system.

10. The computer program product of claim 9, wherein the computer program product is operable such that the command is received by the physical sensor sensing a predetermined physical gesture of a user.

11. The computer program product of claim 1, wherein the value comprises a width of the input viewport and the value differs compared with a width of an output viewport of a raster surface.

12. The computer program product of claim 11, wherein a shape of the input viewport is different compared with a shape of the output viewport.

13. The computer program product of claim 11, wherein the adjusting further comprises modifying a height of the input viewport that is used to cut the display content out of the render surface stored in memory.

14. A method, comprising:
    operating a display system in a first state associated with an occlusion of at least a portion of an image resulting from a non-display surface associated with the display system during execution of an application, wherein a width of the non-display surface is specified by a numerical value that is modified by a user;
    receiving a command to operate the display system in a second state associated with the occlusion of the at least a portion of the image resulting from the non-display surface associated with the display system, wherein the command is received without displaying a user interface over the application;
    adjusting display content including the at least a portion of the image such that the at least a portion of the image is displayed within an area of a display surface that is not occluded by the non-display surface in response to the command, wherein the adjusting comprises modifying a value associated with an input viewport that is used to cut the display content out of a render surface stored in memory, and the adjusting is performed without displaying a user interface over the application; and
    operating the display system in the second state during execution of the application, in response to the command.

15. The method of claim 14, wherein the value comprises a width of the input viewport and the value differs compared with a width of an output viewport of a raster surface.

16. The method of claim 15, wherein a shape of the input viewport is different compared with a shape of the output viewport.

17. The method of claim 15, wherein the adjusting further comprises modifying a height of the input viewport that is used to cut the display content out of the render surface stored in memory.

18. An apparatus, comprising:
a processor for:
  operating a display system in a first state associated with an occlusion of at least a portion of an image resulting from a non-display surface associated with the display system during execution of an application, wherein a width of the non-display surface is specified by a numerical value that is modified by a user;
  receiving a command to operate the display system in a second state associated with the occlusion of the at least a portion of the image resulting from the non-display surface associated with the display system, wherein the command is received without displaying a user interface over the application;
  adjusting display content including the at least a portion of the image such that the at least a portion of the image is displayed within an area of a display surface that is not occluded by the non-display surface in response to the command, wherein the adjusting comprises modifying a value associated with an input viewport that is used to cut the display content out of a render surface stored in memory, and the adjusting is performed without displaying a user interface over the application; and
  operating the display system in the second state during execution of the application, in response to the command.

19. The apparatus of claim 18, wherein the value comprises a width of the input viewport and the value differs compared with a width of an output viewport of a raster surface.

20. The apparatus of claim 19, wherein a shape of the input viewport is different compared with a shape of the output viewport.

* * * * *